3,384,546
DIRECTLY COMPRESSED LOW-DENSITY CRYSTALLINE SORBITOL PHARMACEUTICAL TABLETS
Blaze Thomas Palermo, Elkhart, Ind., assignor to Miles Laboratories, Inc., Elkhart, Ind., a corporation of Indiana
No Drawing. Filed May 28, 1965, Ser. No. 459,896
11 Claims. (Cl. 167—82)

ABSTRACT OF THE DISCLOSURE

Pharmaceutical tablets are directly compressed from a mixture of at least one active ingredient with an excipient from the group of sorbitol and a blend of sorbitol with mannitol, dextrose, and/or lactose. The sorbitol employed has a bulk density of from about 0.530 to 0.545 gram per cubic centimeter and the tablet produced is characterized by being nongritty and having a low rate of moisture pick-up.

---

This invention relates to pharmaceutical tablets and to a process for producing same. More specifically, this invention relates to a tablet composition containing sorbitol or a blend of sorbitol and other polyhydric sugars or sugar alcohols as an excipient, which may be directly compressed to obtain a stable, non-gritty chewable tablet.

The preferred tablet composition of this invention is a chewable vitamin preparation, but the inventive concept also includes various other medicinal tablets which can be prepared by direct compression. Such preparations include chewable antacid tablets, chewable analgesic tablets, and the like.

Successful tablet making requires a material that has the proper physical shape, is dry and free flowing, possesses sufficient binding qualities to cohere when compressed and does not stick to the punches and dies of the tablet compressing machines. Some materials possess the aforementioned properties and may be directly compressed into tablets without further preparation. The vast majority of substances, however, lack one or all of these characteristics and require special preparation before compressing. Such special preparation usually consists of one of two methods or a combination thereof; viz., (1) wet granulation, or (2) granulation by the precompression or "slug" method.

In both of these methods, the first step in tablet making is to blend the ingredients together by any of various well known blending procedures.

In the wet granulation method the blended powders are mixed with a liquid menstruum which includes a binder material to enhance cohesiveness of the powders and thereby facilitate the formation of tablets. The resulting wet granulation is dried and the dried mixture is sifted through a screen of suitable fineness to remove or break up the lumpy portion of the granulation. The granulation is then blended with suitable pharmaceutical adjuncts, such as lubricants and disintegrants and, less frequently, with additional active ingredients. After the final blending step, the granulation is ready for compression into the final tablet form.

Granulation by the precompression or "slug" method is particularly suited to tablet compositions having ingredients which are sensitive to moisture or will not endure elevated drying temperatures and which ingredients as a dry mixture have sufficient binding or cohesive properties to form granules when compressed. In the precompression method the initial dry blend of ingredients is compressed into large wafers or tablets designated as "slugs." The "slugs" are then ground to form smaller granules of a desired size. Lubricants and disintegrants, and frequently active ingredients, are then blended with the smaller granules in a suitable blendor, and the resulting granulation is then ready for compression into the final tablet form.

The precompression method of preparing pharmaceutical ingredients for tabletting has an advantage over the wet granulation method in that it is somewhat less time consuming and does not require liquid granulating menstrua or drying kilns. As those skilled in the art will appreciate, however, both of these methods are more time consuming, more laborious and, consequently, more expensive, than the direct compression method. In the direct compression method, for example, the dry tablet ingredients are simply blended with appropriate adjuncts, such as lubricants, disintegrants, excipients and the like, and the resulting blend is then compressed directly into the final tablet form. Additionally, the possibility of manufacturing errors is lessened in the direct compression method since the process involves fewer steps than either wet granulation or pre-compression. Further, the direct compression method does not require drying equipment and, as an additional advantage, the possibility of deterioration of active ingredients from repeated exposure to the atmosphere is considerably reduced.

The ideal chewable tablet must be non-hygroscopic and chemically stable, it must disintegrate smoothly at a proper rate, it must have a pleasant taste and "mouthfeel" and it must leave no unpleasant aftertaste. Obviously many of these properties must be contributed to the tablet composition by the excipient. Because mannitol possesses an unmatched combination of these properties it has been almost exclusively used in recent years as the principal excipient in chewable tablet formulations.

Use of mannitol as an excipient in a chewable tablet composition, however, has the disadvantage that the high cost of this product makes its use as a tablet excipient commercially unattractive. A more significant disadvantage, however, is that because of the poor binding and flow properties of mannitol, the wet granulation or "slug" method must be employed in formulating a satisfactory chewable tablet composition containing mannitol as an excipient.

Another object is to provide a convenient means of producing chemically stable chewable tablet compositions containing as an excipient sorbitol or a blend of sorbitol and other polyhydric sugar alcohols.

Still another object is to provide chewable tablet compositions which are characterized as being non-gritty, that is, having good "mouthfeel" characteristics.

Because of the aforementioned disadvantages of mannitol, the pharmaceutical art has conducted extensive studies with various materials in an attempt to develop better and more economical chewable tablet excipients. One of the materials which has been a logical choice for investigation as to its utility as a tablet excipient is sorbitol, a steric isomer of mannitol. Because of the structural similarity of sorbitol and mannitol, both compounds have similar properties which would suggest their suitability as pharmaceutical excipients. For instance, both compounds have a pleasant "sweet cool" taste, both are stable to high heat and in the presence of most medicaments both are suitable for use in foods. Despite their structural similarity, however, the two compounds differ greatly with respect to their moisture pick-up characteristics. Sorbitol is highly hygroscopic and extremely soluble in water, whereas mannitol is a non-hygroscopic powder of limited solubility. Because of its high hygroscopicity, therefore, manufacturers of sorbitol have generally discouraged the pharmaceutical industry from using sorbitol as a tablet excipient, the primary reason being that most pharmaceutical tablets must be protected against moisture pick-up to avoid undue softening or hardening of the tablets or deterioration of the active ingredients of the tablet composition. This is particularly true of vitamin tablet preparations since most vitamins are extremely susceptible to deterioration by moisture.

In a study conducted by one major manufacturer of sorbitol, as described in "Hygroscopicity Comparison Study of Mannitol and Sorbitol as Chewable Tablet Excipients," Pharmaceutical Bulletin LM-20 (August 19, 1963), Atlas Chemical Industries, Inc., the investigators prepared both granulations and tablets comprising an all-mannitol excipient, an all-sorbitol excipient and several excipient preparations comprising a blend of sorbitol and mannitol. Each of the excipient preparations was then checked for moisture pick-up after prolonged exposure to ordinary high humidity conditions. Such humidity conditions are those normally encountered in storage or on drug store shelves. In each instance the all-mannitol excipient picked up only a negligible amount of moisture, whereas the all-sorbitol and the sorbitol-mannitol excipient preparations each picked up an undesirably high amount of moisture. Further studies were conducted to determine the type of packaging which would satisfactorily protect tablet compositions containing a sorbitol or sorbitol-mannitol excipient from undue moisture pick-up. It was found that only a special type of expensive packaging material, such as a foil strip, would adequately protect the tablets against moisture deterioration. From the above studies the investigators concluded that sorbitol as a tablet ingredient is commercially undesirable regardless of any special provisions which are taken in the manufacturing and packaging of sorbitol-based tablets.

Contrary to the teaching of the prior art, the present invention is based on the unexpected and surprising discovery that a unique form of commercially available granular, low density, crystalline sorbitol may be employed either as the entire tablet excipient, or it may be blended with other polyhydric sugars or sugar alcohols such as mannitol, dextrose, lactose, and the like, to provide an excipient which may be dry blended with at least one active ingredient and the conventional lubricants, disintegrants, flavors, fillers and the like, to provide compositions which may be directly compressed to form chemically stable, non-gritty, chewable tablets having a low rate of moisture pick-up and having good "mouth-feel" characteristics.

In contrast to the unique form of sorbitol utilized in the present invention, the prior art crystalline sorbitol compositions have been found to be unsatisfactory as excipients in a chewable tablet composition amenable to direct compression. Even with extensive processing prior to compounding of the tablet, the prior sorbitol compositions, when employed as an excipient in a directly compressed chewable tablet, impart undesirable characteristics, such as grittiness, to the tablet composition.

Although it is not completely understood why the sorbitol product of the present invention provides a superior excipient material over the prior art compositions, it is believed to be due to a substantial difference in the physical characteristics of the respective compositions. One such property of the sorbitol composition of this invention, which is believed to render it more amenable to direct compression tabletting, is the extremely low density of the product. More specifically, the preferred sorbitol excipient of this invention has a bulk density of from about 0.530 to 0.545 gram per cubic centimeter, preferably about 0.537 gram per cubic centimeter, and a particle size in the range of from about 16 to 40 mesh. By contrast, the prior commercially available crystalline sorbitol compositions have a density of about 1.49.

In the practice of this invention the flotation test described below has been found to be useful in determining the density of the sorbitol excipient, it being understood that any conventional procedure may be used for this determination. Any commercially available sorbitol meeting the specifications described herein would be operable in this invention.

(A) Flotation solution.—A flotation solution having a density in the range of about 1.450 to 1.460 at 25° C. is prepared as follows:

(1) Accurately weigh 18±0.010 gram of corn oil (U.S.P., winterized, sp. gr. 0.914–0.921, 25° C./25° C.) into a tared 100 ml. volumetric flask. Add 50 ml. of carbon tetrachloride (Reagent Grade, sp. gr. 1.583–1.585, 25° C./25° C.) mix and immerse the flask in a constant temperature (25° C.±0.1° C.) water bath and adjust to volume at 25° C. with the carbon tetrachloride. Remove the flask from the water bath, thoroughly dry the outside of the flask and reweigh it.

(2) The density of the flotation solution is calculated according to the following equation:

$$\text{Density at } 25° \text{C.} = W + 0.0010$$

where:

$W$ = weight (in g.) of liquid in flask at 25° C.
$V$ = volume (in cc.) of flask at 25° C.
0.0010 = corection factor to compensate for air buoyancy (B) Test procedure.—In a 50 cc. beaker resting on a vibration free surface place 25 cc. of the flotation solution at 25° C. Gently pour a 0.5 g. sample of the sorbitol being tested from a piece of weighing paper onto the surface of the liquid without touching the beaker. A minimum of 95% of the granules should float on the surface of the solution for at least 3 minutes.

In the tablet compositions of this invention sorbitol may comprise from 25% to 100% by weight of the tablet excipient. The preferred excipient is a blend of sorbitol and mannitol, with sorbitol comprising about 55% by weight of the excipient.

To obtain the desired tablet compositions of this invention it is desirable that the tablet be compounded under conditions of controlled humidity and temperature. For example, the relative humidity should be in a range of from about 20% to 25%, at a dry bulb temperature of from about 74° F. to 76° F. Although the aforementioned conditions are not considered critical, compounding of the present tablet compositions outside of the specified humidity and temperature ranges may result in such undesirable effects as hardening of the tablets and partial degradation of the active ingredient (particularly true of vitamin preparations) due to excess moisture pick-up during the compounding operation.

Another desirable but not critical condition in compounding the tablet compositions of this invention is the procedure for blending of the dry ingredients. According to the practice of this invention the dry ingredients are blended in the order of their free moisture content. Specifically, those ingredients having the lowest moisture content are admixed or blended first, with those ingredients having a higher moisture content being added progressively in increasing order of their free moisture content.

The present invention is more clearly illustrated, but not limited, by the following examples, in which the procedure for mixing of the ingredients is progressively in increasing order of the free moisture content of the respective ingredients.

EXAMPLE 1

The formulation set out below is for a chewable multiple vitamin tablet wherein the tablet excipient is a blend of sorbitol and mannitol, with sorbitol comprising about 55% by weight of the tablet excipient.

| Ingredient: | Quantity (mgm. per tablet) |
|---|---|
| Citric acid, U.S.P. (anhydrous) | 17.50 |
| Sodium ascorbate | 64.70 |
| Mannitol, N.F. | 118.00 |
| Thiamine mononitrate, U.S.P. (33⅓%) | 6.60 |
| Riboflavin, U.S.P. (25%) | 10.50 |
| Niacinamide, U.S.P. (33⅓%) | 60.00 |
| Pyridoxine hydrochloride, U.S.P. | 1.05 |
| Sodium cyclamate, N.F. | 7.50 |
| Sorbitol, bulk density 0.530–0.545 g. per cc., 16–40 mesh (crystalline granules) | 144.00 |
| magnesium stearate, U.S.P. | 6.00 |
| Pineapple (imitation) | 0.75 |
| Vitamin A and D | 9.25 |
| Vitamin A | 2.25 |
| Orange juice (imitation) | 0.50 |
| Vanilla (imitation) | 2.00 |
| Vitamin $B_{12}$ | 0.115 |
| Rice starch | 25.00 |
| Saccharin sodium, U.S.P. (soluble powder) | 0.75 |
| Yellow dye, F.D./C. No. 6 (lake) | 3.00 |
| Total tablet weight | 479.465 |

The procedure for mixing and tabletting of the ingredients in the above formulation was as follows:

(1) in a conventional ribbon blendor the citric acid, sodium ascorbate, mannitol and niacinamide are mixed for about 7 minutes. (Prior to blending of the ingredients, they may be passed through an oscillating granulator fitted with a No. 16 stainless steel screen, if this is considered necessary).

(2) The thiamine mononitrate, riboflavin, pyridoxine hydrochloride, sodium cyclamate and about one-half of the coloring dye are combined in a suitable stainless steel blendor and passed through an oscillating granulator fitted with a No. 16 stainless steel screen. This mixture is then transferred to the ribbon blendor.

(3) The sorbitol granules and the remaining half of the coloring dye are mixed for about 7 minutes in a small sigmoid blendor and the colored granules are then transferred to the ribbon blendor.

(4) The magnesium stearate is passed through an oscillating granulator fitted with a No. 24 screen. The screened material is then transferred to a suitable stainless steel blendor where it is combined with the vitamin A, vitamin A and D and vitamin $B_{12}$. The combined ingredients are mixed for about 10 minutes and retained in the blendor.

(5) The pineapple, orange juice and vanilla flavors are rough mixed with the rice starch and saccharin sodium on a sheet of paper and the mixture is passed through a No. 20 hand screen. The mixture is then added to the mixture of step (4) in the blendor and mixed for about 5 minutes.

(6) The combined mixture of steps (4) and (5) is then added to the mixture of steps (1), (2) and (3) in the ribbon blendor and the entire blend is mixed for about 10 minutes.

(7) The dry blended ingredients are then directly compressed into tablets on a conventional rotary tablet press.

EXAMPLE 2

The formulation set out below is for a chewable multiple vitamin tablet wherein the tablet excipient is a blend of sorbitol and mannitol, with sorbitol comprising about 25% by weight of the tablet excipient.

| Ingredient: | Quantity (mgm. per tablet) |
|---|---|
| Citric acid, U.S.P. (anhydrous) | 17.50 |
| Sodium ascorbate | 64.70 |
| Mannitol, N.F. | 196.50 |
| Thiamine mononitrate, U.S.P. (33⅓%) | 6.60 |
| Riboflavin, U.S.P. (25%) | 10.50 |
| Niacinamide, U.S.P. (33⅓%) | 60.00 |
| Pyridoxine hydrochloride, U.S.P. | 1.05 |
| Sodium cyclamate, N.F. | 7.50 |
| Sorbitol, bulk density 0.530–0.545 g. per cc., 16–40 mesh (crystalline granules) | 65.50 |
| Magnesium stearate, U.S.P. | 6.00 |
| Pineapple (imitation) | 0.75 |
| Vitamin A and D | 9.25 |
| Vitamin A | 2.25 |
| Orange juice (imitation) | 0.50 |
| Vanilla (imitation) | 2.00 |
| Vitamin $B_{12}$ | 0.115 |
| Rice starch | 25.00 |
| Saccharin sodium, U.S.P. (soluble powder) | 0.75 |
| Yellow dye, F.D. & C. No. 6 (lake) | 3.00 |
| Total tablet weight | 479.465 |

The procedure for mixing of the ingredients in the above formulation and direct compression of the dry blended ingredients to obtain the finished tablet is identical to that described in Example 1.

EXAMPLE 3

The formulation set out below is for a chewable multiple vitamin tablet wherein the entire tablet excipient is sorbitol, or in other words, sorbitol comprises 100% by weight of the tablet excipient.

| Ingredient: | Quantity (mgm. per tablet) |
|---|---|
| Citric acid, U.S.P. (anhydrous) | 17.50 |
| Sodium ascorbate | 64.70 |
| Thiamine mononitrate, U.S.P. (33⅓%) | 6.60 |
| Riboflavin, U.S.P. (25%) | 10.50 |
| Niacinamide, U.S.P. (33⅓%) | 60.00 |
| Pyridoxine hydrochloride, U.S.P. | 1.05 |
| Sodium cyclamate, N.F. | 7.50 |
| Sorbitol, bulk density 0.530–0.545 g. per cc., 16–40 mesh (crystalline granules) | 262.00 |
| Magnesium stearate, U.S.P. | 6.00 |
| Pineapple (imitation) | 0.75 |
| Vitamin A and D | 9.25 |
| Vitamin A | 2.25 |
| Orange juice (imitation) | 0.50 |
| Vanilla (imitation) | 2.00 |
| Vitamin $B_{12}$ | 0.115 |
| Rice starch | 25.00 |
| Saccharin sodium, U.S.P. (soluble powder) | 0.75 |
| Yellow dye, F.D. & C. No. 6 (lake) | 3.00 |
| Total tablet weight | 479.465 |

The procedure for mixing of the ingredients in the above formulation and direct compression of the dry blended ingredients to obtain the finished tablet is identical to that described in Example 1.

EXAMPLE 4

The formulation set out below is for a chewable multiple vitamin tablet wherein the tablet excipient is a blend of sorbitol and dextrose, with sorbitol comprising about 55% by weight of the tablet excipient.

| Ingredient: | Quantity (mgm. per tablet) |
|---|---|
| Citric acid, U.S.P. (anhydrous) | 17.50 |
| Sodium ascorbate | 64.70 |
| Dextrose, U.S.P. (cerelose) | 118.00 |
| Thiamine mononitrate, U.S.P. (33⅓) | 6.18 |
| Riboflavin, U.S.P. (25%) | 10.00 |
| Niacinamide, U.S.P. (33⅓%) | 60.00 |
| Pyridoxine hydrochloride, U.S.P. | 1.05 |
| Sodium cyclamate, N.F. | 7.50 |
| Sorbitol, bulk density 0.530–0.545 g. per cc., 16–40 mesh (crystalline granules) | 144.00 |
| Magnesium stearate, U.S.P. | 6.00 |
| Pineapple (imitation) | 0.75 |
| Vitamin A and D | 5.10 |
| Vitamin A | 5.92 |
| Orange juice (imitation) | 0.50 |
| Vanilla (imitation) | 2.00 |
| Vitamin $B_{12}$ | 0.115 |
| Rice starch | 25.00 |
| Saccharin sodium, U.S.P. (soluble powder) | 0.75 |
| Yellow dye, F.D. & C. No. 6 (lake) | 3.00 |
| Total tablet weight | 478.064 |

The procedure for mixing of the ingredients in the above formulation and direct compression of the dry blended ingredients to obtain the finished tablet is identical to that described in Example 1.

EXAMPLE 5

The formulation set out below is for a chewable tablet containing high potency Vitamin C, wherein the tablet excipient is a blend of sorbitol and mannitol, with sorbitol comprising about 55% by weight of the tablet excipient.

| Ingredient: | Quantity (mgm. per tablet) |
|---|---|
| Sodium ascorbate | 442.80 |
| Ascorbic acid | 110.10 |
| Mannitol, N.F. | 236.25 |
| Sorbitol, bulk density 0.530–0.545 g. per cc., 16–40 mesh (crystalline granules) | 288.75 |
| Magnesium stearate, U.S.P. | 10.00 |
| Pineapple (imitation) | 2.00 |
| Vanilla (imitation | 5.00 |
| Orange juice (imitation) | 1.50 |
| Colloidal silica | 3.00 |
| Total tablet weight | 1,116.40 |

The procedure for mixing and tabletting of the ingredients in the above formulation was as follows:

(1) The sodium ascorbate, ascorbic acid and mannitol are charged to a suitable stainless steel ribbon bendor. (Before these materials are put into the blendor, they may be passed through an oscillating granulator fitted with a No. 20 screen, if this is considered necessary.)

(2) In another suitable blendor the colloidal silica, magnesium stearate and the pineapple, vanilla and orange juice flavors are mixed for about 7 minutes and then passed through an oscillating granulator fitted with a No. 24 screen.

(3) The mixture of step (2), along with the sorbitol, is then added to the mixture of step (1) in the ribbon blendor and the combined blend is mixed for about 7 minutes.

(4) The dry blended ingredients were then directly compressed into tablets according to the procedure of Example 1.

EXAMPLE 6

The formulation set out below is for a chewable antacid tablet wherein the tablet excipient is a blend of sorbitol and mannitol, with sorbitol comprising about 55% by weight of the tablet excipient.

| Ingredient: | Quantity (mgm. per tablet) |
|---|---|
| Calcium carbonate, U.S.P. (precipitated) | 375.00 |
| Magnesium trisilicate, U.S.P. | 150.00 |
| Mannitol, N.F. | 236.00 |
| Sorbitol, bulk density 0.530–0.545 g. per cc., 16–40 mesh (crystalline granules) | 288.00 |
| Saccharin sodium, U.S.P. (soluble powder) | 2.00 |
| Cream mint (flavor) | 6.00 |
| Magnesium stearate, U.S.P. | 20.00 |
| Total tablet weight | 1077.00 |

The procedure for mixing and tabletting of the ingredients in the above formulation was as follows:

(1) In a suitable stainless steel blendor the calcium carbonate and mannitol are mixed for about 5 minutes. (Prior to blending of the ingredients they may be passed through an oscillating granulator fitted with a No. 20 screen, if this is considered necessary).

(2) The saccharin sodium, cream mint and magnesium stearate are rough mixed on a sheet of paper and passed through a No. 24 hand screen.

(3) The mixture of step (2) is combined with the sorbitol granules and the magnesium trisilicate and the resulting mixture is added to the mixture of step (1) in the blendor. The entire blend is then mixed for about 7 minutes.

(4) The dry blended ingredients are then directly compressed into tablets according to the procedure of Example 1.

EXAMPLE 7

The formulation set out below is for a chewable antacid tablet wherein the tablet excipient is a blend of sorbitol and lactose, with sorbitol comprising about 25% by weight of the tablet excipient.

| Ingredient: | Quantity (mgm. per tablet) |
|---|---|
| Aluminum hydroxide-magnesium carbonate (co-dried gel) | 324.00 |
| Sorbitol, 16–40 mesh (crystalline granules), bulk density 0.530–0.545 g. per cc. | 162.00 |
| Lactose (spray dried) | 488.00 |
| Saccharin sodium, U.S.P. (soluble powder) | 2.00 |
| Cream mint (flavor) | 4.00 |
| Magnesium stearate, U.S.P. | 15.00 |
| Total tablet weight | 995.00 |

The procedure for mixing and tabletting of the ingredients in the above formulation was as follows:

(1) The aluminum hydroxide-magnesium carbonate and sorbitol are put into a suitable stainless steel ribbon blendor and mixed for about 5 minutes.

(2) The lactose, saccharin sodium and cream mint are rough mixed on a sheet of paper and passed through a No. 24 hand screen.

(3) The mixtures of steps (1) and (2) are then combined in the blendor and mixed for about 7 minutes.

(4) The dry blended ingredients are then directly compressed into tablets according to the procedure of Example 1.

EXAMPLE 8

The formulation set out below is for a chewable antacid tablet wherein the entire tablet excipient is sorbitol, that is, sorbitol comprises 100% by weight of the tablet excipient.

| Ingredient: | Quantity (mgm. per tablet) |
|---|---|
| Aluminum hydroxide-magnesium carbonate (co-dried gel) | 324.00 |
| Sorbitol, 16–40 mesh (crystalline granules), bulk density 0.530–0.545 g. per cc. | 500.00 |
| Saccharin sodium, U.S.P. (soluble powder) | 2.00 |
| Cream mint (flavor) | 6.00 |
| Magnesium stearate, U.S.P. | 15.00 |
| Total tablet weight | 847.00 |

The procedure for mixing of the ingredients in the above formulation is identical to the procedure described in Example 7. Direct compression of the dry blended ingredients to obtain the finished tablet is in accordance with the procedure of Example 1.

EXAMPLE 9

The formulation set out below is for a chewable analgesic tablet wherein the tablet excipient is a blend of sorbitol and mannitol, with sorbitol comprising about 55% by weight of the tablet excipient.

| Ingredient: | Quantity (mgm. per tablet) |
|---|---|
| Sorbitol, bulk density 0.530–0.545 g. per cc., 16–40 mesh (crystalline granules) | 275.00 |
| Mannitol, N.F. | 225.00 |
| Acetylsalicylic acid | 360.00 |
| Sucaryl sodium, N.F. | 15.00 |
| Saccharin sodium, U.S.P. (dried at 160° C.) | 1.50 |
| Talc, U.S.P. | 18.00 |
| Cream mint (flavor) | 3.00 |
| Total tablet weight | 897.50 |

The procedure for mixing and tabletting of the ingredients in the above formulation was as follows:

(1) The mannitol is passed through a No. 20 screen and the screened material is charged to a suitable blendor.

(2) The sodium cyclamate, saccharin sodium, talc and cream mint are rough mixed on a sheet of paper, passed through a No. 24 hand screen and charged to the blendor.

(3) The sorbitol and acetylsalicylic acid are then added to the mixtures of steps (1) and (2) in the blendor and the entire blend is mixed for about 7 minutes.

(4) The dry blended ingredients are then directly compressed into tablets according to the procedure of Example 1.

EXAMPLE 10

The formulation set out below is for a chewable analgesic tablet wherein the tablet excipient is a blend of sorbitol and lactose, with sorbitol comprising about 25% by weight of the tablet excipient.

| Ingredient: | Quantity (mgm. per tablet) |
|---|---|
| Sorbitol, bulk density 0.530–0.545 g. per cc. 16–40 mesh (crystalline granules) | 125.00 |
| Lactose (spray-dried) | 375.00 |
| Acetylsalicylic acid | 360.00 |
| Sodium cyclamate, N.F. | 15.00 |
| Saccharin sodium, U.S.P. (dried at 160° C.) | 1.50 |
| Talc, U.S.P. | 8.00 |
| Cream mint (flavor) | 3.00 |
| Total tablet weight | 897.50 |

The procedure for mixing and tabletting of the ingredients in the above formulation was as follows:

(1) On a sheet of paper rough mix the lactose, sodium cyclamate, saccharin sodium, talc and cream mint and pass the mixture through a No. 24 hand screen.

(2) Charge the sorbitol and acetylsalicylic acid to a suitable blendor and mix for about 5 minutes. Add the mixture of step (1) to the blendor and mix the entire blend for about 5 minutes.

(3) The dry blended ingredients are then directly compressed into tablets according to the procedure of Example 1.

EXAMPLE 11

The formulation set out below is for chewable analgesic tablet wherein the entire tablet excipient is sorbitol, that is, sorbitol comprises 100% by weight of the tablet excipient.

| Ingredient: | Quantity (mgm. per tablet) |
|---|---|
| Sorbitol, bulk density 0.530–0.545 g. per cc., 16–40 mesh (crystalline granules) | 500.00 |
| Acetylsalicylic acid | 360.00 |
| Sucaryl sodium, N.F. | 15.00 |
| Saccharin sodium, U.S.P. (dried at 160° C.) | 1.50 |
| Talc, U.S.P. | 18.00 |
| Cream mint (flavor) | 3.00 |
| Total tablet weight | 897.50 |

The procedure for mixing and tabletting of the ingredients in the above formulation was as follows:

(1) On a sheet of paper rough mix the sodium cyclamate, saccharin sodium, talc and cream mint and pass the material through a No. 24 hand screen.

(2) Charge the sorbitol and acetylsalicylic acid to a suitable stainless steel blendor and mix for 5 minutes. Add the mixture of step (1) to the blendor and mix the entire blend for about 7 minutes.

(3) The dry blended ingredients are then directly compressed into tablets according to the procedure of Example 1.

As mentioned hereinabove one of the requisite features of an ideal chewable tablet is that it must have good "mouthfeel" characteristics, that is, it must be a non-gritty tablet which will disintegrate smoothly in the mouth. This characteristic in a chewable tablet is sometimes referred to as the consistency of the tablet. Since mannitol is known to impart good consistency to a chewable tablet, the prior art chewable tablet compositions have utilized mannitol as the principal excipient despite the disadvantages inherent therein. Accordingly, the consistency of the chewable tablet compositions of this invention were compared with a prior art chewable tablet containing an all-mannitol excipient in a series of taste panel tests. In the comparison tests conducted the prior art composition, which is designated as the CONTROL tablet, is a chewable vitamin tablet of the same formulation as Example 1 except that the tablet excipient comprises 100% mannitol. The composition designated SAMPLE tablet is the chewable vitamin tablet composition of Example 1, which is considered representative of the tablet compositions of this invention. The test procedure was as follows:

(1) In the first test series 18 persons were given a group of 3 tablets each to chew, with the order of each group of tablets being alternated so that some persons chewed 2 CONTROL tablets and 1 SAMPLE tablet and some persons chewed 2 SAMPLE tablets and 1 CONTROL tablet. After each person had chewed 3 tablets he was asked to identify those tablets having the same consistency. Only 3 persons out of the 18 tested were able to pair up either the CONTROL tablets or the SAMPLE tablets for consistency. In other words, only 3 persons could differentiate between the consistency of the CONTROL tablets and the SAMPLE tablets.

(2) In the second test series the same 18 persons were given the same test described in the first series and in this test only 5 persons out of the 18 tested were able to differentiate between the consistency of the CONTROL tablets and the SAMPLE tablets.

On the basis of the foregoing test it was concluded that since only a few persons could differentiate between the consistency of the prior art tablets and the tablets of the present invention, the difference in consistency was considered to be insignificant, and the "mouthfeel" of the chewable tablets of this invention was, therefore, equivalent to the desired standard.

Despite the hygroscopic properties of sorbitol, which allegedly make it unsuitable as a tablet excipient, the present chewable tablet compositions are characterized as being chemically stable against moisture deterioration under temperature and humidity conditions normally encountered in shipping, storage on retailers' shelves, or everyday use in the home. In conducting stability studies on the tablet compositions of this invention the studies were conducted in the home, this type of test being considered as representative of the most extreme moisture conditions to which a chewable tablet is likely to be subjected. In this test the stability of the tablet compositions of this invention, as represented by the chewable vitamin tablet composition of Example 1, was compared with a representative prior art chewable vitamin tablet composition. The prior art tablet composition has the same formulation as the composition of Example 1, except that the tablet excipient comprises 100% mannitol. For purposes of this test the tablet compositions of Example 1 are designated as SAMPLE and the prior art tablet composition is designated as CONTROL. The procedure was as follows:

Six persons were each given 100 SAMPLE tablets packaged in a conventional glass container with stopper and 100 CONTROL tablets similarly packaged. Using conventional procedures, several tablets from each 100-tablet batch were assayed for Vitamin A activity and checked for hardness to obtain an average value in each instance. These values appear in the column designated "Original" in Table I. Each person kept the tablets at home for 30 days. During the entire 30-day period three of the participants opened each of the containers daily, withdrew and discarded from 1 to 3 tablets and left the containers open from 10–11 minutes, then re-inserted the stopper. The other three participants followed the same procedure except that the containers were left open each day for from 20–21 minutes.

At the end of the 30-day period the tablets remaining in each container were returned to the laboratory and checked for (1) loss of vitamin activity, and (2) hardness, both tests being a direct indication of the stability of the tablet with respect to moisture deterioration. The results are set out in Table I below:

exposed tablets than for the pre-exposed tablets, the very slight difference is due to the expected margin of scientific error in calculating these assay values and not to an actual gain in the vitamin potency, as the data would seem to indicate.

The increase in hardness of the exposed tablets over the hardness of the pre-exposed tablets, in both the SAMPLE tablets and the CONTROL tablets, clearly indicates that both tablet compositions pick up a certain amount of moisture during prolonged exposure to the atmosphere. The highest hardness attained by either tablet composition, however, is considered well within pharmaceutically acceptable standards for a chewable tablet composition. Moreover, the fact that the hardness increase of the SAMPLE tablet was somewhat less than that of the CONTROL tablet is considered particularly significant in attesting to the excellent moisture stability of the chewable tablet compositions of this invention.

In summary, the present invention relates to chewable tablet compositions and a process for producing same wherein said tablet compositions contain sorbitol or a blend of sorbitol and other polyhydric sugars or sugar alcohols, such as mannitol, dextrose and lactose, as the tablet excipient. The preferred sorbitol excipient renders the tablet composition amenable to direct compression to obtain a stable, non-gritty, chewable tablet. The sorbitol excipient employed in the practice of this invention has a bulk density of from about 0.530 to 0.545.

What is claimed is:

1. A nongritty pharmaceutical tablet directly compressed without granulation having a low rate of moisture pick-up consisting essentially of at least one active ingredient and an excipient from the group selected from sorbitol and a blend of sorbitol with a member of the group selected from mannitol, dextrose and lactose and said sorbitol having a bulk density of from about 0.530 to 0.545 gram per cubic centimeter and being granular and crystalline and substantially free of any crystalline sorbitol having a bulk density of about 1.49 grams per cubic centimeter and a high rate of moisture pick-up.

2. A tablet according to claim 1 wherein said sorbitol comprises from about 25% to about 100% by weight of said excipient.

3. A tablet according to claim 1 wherein the tablet excipient is a blend of sorbitol and mannitol, with sorbitol comprising about 55% by weight of said tablet excipient.

4. A tablet according to claim 1 wherein said medicinal tablet is a chewable vitamin tablet.

5. A tablet according to claim 1 wherein said sorbitol has a bulk density of 0.537 gram per cubic centimeter.

6. A process for producing a nongritty pharmaceutical tablet having a low rate of moisture pick-up comprising the steps of mixing together without granulation at least

TABLE I

| Test | No. | Vitamin A assay (units per tablet) | | Hardness, kg. | |
| --- | --- | --- | --- | --- | --- |
| | | CONTROL | SAMPLE | CONTROL | SAMPLE |
| Original (before exposure) | 0 | 5,760 | 5,930 | 10.9 | 8.3 |
| After 10–11 minutes exposure time. | 1 | 5,960 | 5,870 | 16.5 | 9.9 |
| | 2 | 5,940 | 5,970 | 13.7 | 12.3 |
| | 3 | 5,930 | 5,920 | 19.2 | 12.9 |
| After 20–21 minutes exposure time. | 4 | 5,920 | 5,820 | 20.1 | 14.4 |
| | 5 | 5,990 | 5,940 | 20.1 | 14.4 |
| | 6 | 5,960 | 5,790 | 13.0 | 12.5 |

The assay data of Table I clearly indicate an almost negligible loss in the Vitamin A activity of the SAMPLE tablet composition of this invention even after repeated and prolonged exposure to atmospheric moisture, as evidenced by the fact that the Vitamin A assay values of the tablets after being exposed differed only slightly from the original assay value of the same tablets, i.e., before exposure.

Although some of the assay values for both the SAMPLE tablets and the CONTROL tablets are higher for the one active ingredient and a tablet excipient from the group selected from sorbitol and a blend of sorbitol with a member of the group selected from mannitol, dextrose, and lactose, wherein said sorbitol has a bulk density of from about 0.530 to 0.545 gram per cubic centimeter and being granular and crystalline and substantially free of any crystalline sorbitol having a bulk density of about 1.49 grams per cubic centimeter and a high rate of moisture pick-up, and thereafter directly compressing the resulting mixture into tablets.

7. A process according to claim 6 wherein said active ingredient is a component of a multi-vitamin mixture.

8. A process according to claim 6 wherein said sorbitol has a particle size of from about 16 to 40 mesh.

9. A process according to claim 6 wherein said sorbitol has a bulk density of about 0.537 gram per cubic centimeter.

10. A process according to claim 6 wherein said sorbitol comprises from about 25% to about 100% by weight of said tablet excipient.

11. A process according to claim 6 wherein said sorbitol comprises about 55% by weight of said tablet excipient.

References Cited

UNITED STATES PATENTS

| | | | |
|---|---|---|---|
| 3,145,146 | 8/1964 | Lieberman et al. | 167—82 |
| 3,151,028 | 9/1964 | Hay et al. | 167—93 |
| 3,200,039 | 8/1965 | Thompson | 167—82 |

FOREIGN PATENTS

| | | |
|---|---|---|
| 594,956 | 3/1960 | Canada. |

LEWIS GOTTS, *Primary Examiner.*

S. K. ROSE, *Assistant Examiner.*